United States Patent [19]
Arata et al.

[11] Patent Number: 4,953,950
[45] Date of Patent: Sep. 4, 1990

[54] APPARATUS FOR PRODUCING ULTRA-HIGH POWER ULTRA-HIGH DENSITY LASER BEAM

[76] Inventors: Yoshiaki Arata, 3-13-11, Mukonoso, Amagasaki-shi, Hyogo; Tatsuharu Oda, 2-17-2, Shinsenri Minamimachi, Toyonaka-shi, Osaka, both of Japan

[21] Appl. No.: 271,270

[22] Filed: Nov. 15, 1988

[30] Foreign Application Priority Data

Apr. 30, 1987 [JP] Japan .................................. 62-107675

[51] Int. Cl.$^5$ ...................... G02B 27/14; G02B 17/06
[52] U.S. Cl. .................................... 350/174; 350/618; 219/121.76
[58] Field of Search ............... 350/174, 613, 620, 630, 350/616, 618, 622; 219/121.74, 121.76, 121.77; 362/259, 130, 131

[56] References Cited

U.S. PATENT DOCUMENTS 4,003,639 1/1977 Metarland et al. ................. 350/620
4,566,765 1/1986 Miyauchi et al. ................... 350/174

FOREIGN PATENT DOCUMENTS 2182455 5/1987 United Kingdom ............... 350/174

Primary Examiner—Jon W. Henry
Attorney, Agent, or Firm—Armstrong, Nikaido, Marmelstein, Kubovcik & Murray

[57] ABSTRACT

A plurality of laser beams emitted from lasers are reflected by mirrors to form a bundle of parallel beams or converged by mirrors into a limited narrow space. Lasers and directing mirrors may be arranged on two or more planes to increase the number of beams per bundle. An ultra-high power, ultra-high density pseudo-single laser beam can be generated by use of one or two groups of reflecting mirrors and a focusing mirror for focusing the beams from the reflecting mirrors into one focal point.

4 Claims, 3 Drawing Sheets

FIG. 5A
FIG. 5B
FIG. 6
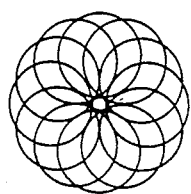
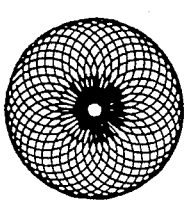
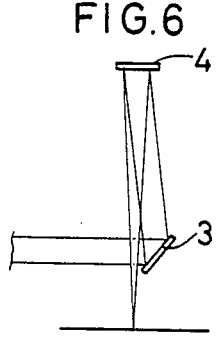
FIG. 7
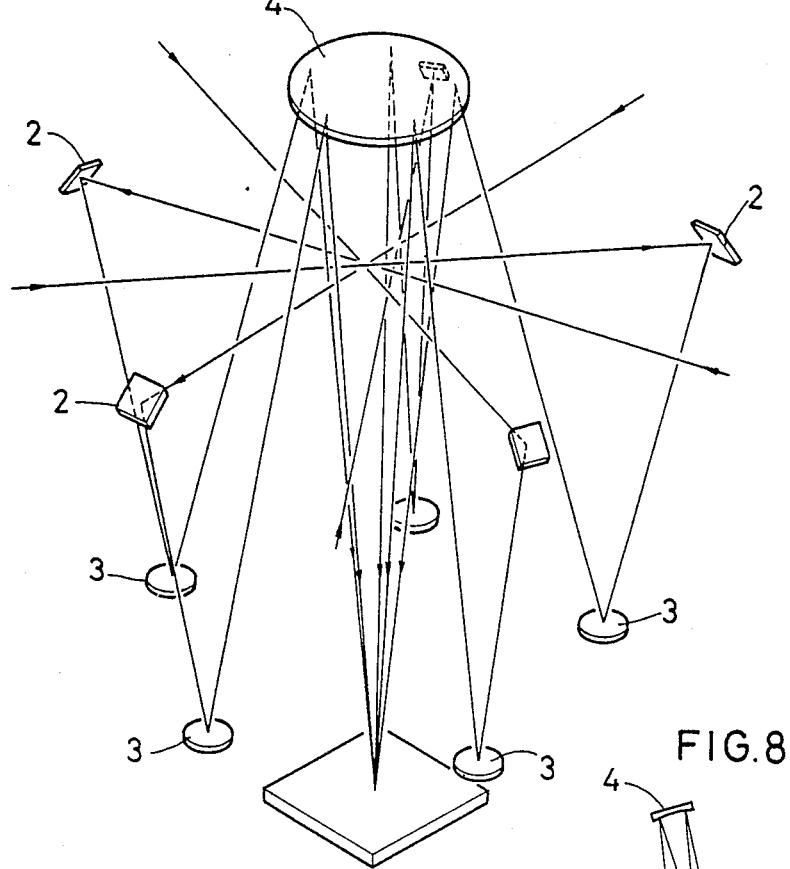
FIG. 8
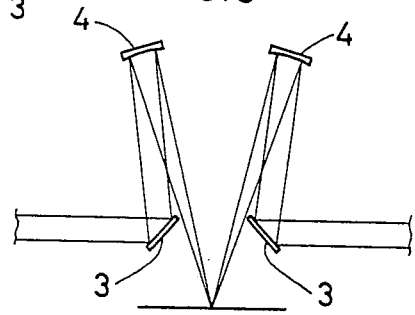

APPARATUS FOR PRODUCING ULTRA-HIGH POWER ULTRA-HIGH DENSITY LASER BEAM

This is a division of application Ser. No. 109,567, filed Oct. 19, 1987, now U.S. Pat. No. 4,828,357.

FIELD OF THE INVENTION

The present invention relates to a method and an apparatus for producing an ultra-high power, ultra-high density pseudo-single laser beam by combining a plurality of laser beams.

BACKGROUND OF THE INVENTION

Various countries have made a huge investment for over a long period of time in the development of high-powered laser However, even a $CO_2$ laser, which is believed to generate high output most effectively, can produce a power of 20 kw at best on a laboratory basis and 10 kw at best on a commercial basis. Furthermore, it is not likely that a laser of higher output will come out in the near future.

Summary of the Invention

An object of the present invention is to provide a method and an apparatus for producing an ultra-high power, ultra-high density pseudo-single laser beam having substantially the same function as a single laser beam by combining or superimposing a plurality of currently used laser beams.

DESCRIPTION OF THE DRAWINGS

Other objects and features of the present invention will become apparent from the following description taken with reference to the accompanying drawings, in which:

FIG. 5A is a schematic sectional view of the pseudo-single beam produced by the method according to the second embodiment by use of the apparatus of one-plane construction;

FIG. 5B is a schematic sectional view of the pseudo-single beam produced by the method according to the second embodiment by use of the apparatus of two-plane construction;

FIG. 6 is a schematic view explaining the "Arata Laser Focus System";

FIG. 7 is a schematic perspective view of the apparatus according to the third embodiment; and FIG. 8 is a schematic view showing a varied form of the apparatus of FIG. 7.

DESCRIPTION OF THE PREFERRED EMBODIMENTS

[First Embodiment]

Figure 1A:
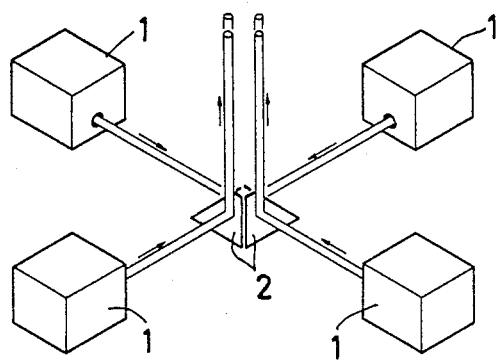
FIG. 1A is a schematic perspective view of the apparatus according to the first embodiment.

Referring to FIGS. 1 and 2, let us suppose there is a vertical reference axis X in space. A plurality of variable-angle mirrors 2, for changing the direction of beams, are arranged around the reference axis on a plane perpendicular to the reference line, inclined at an angle of 45 degrees with respect to the reference axis. As many laser beams as the mirrors are emitted by lasers 1 and sent to the respective mirrors 2 where they change their directions to be directed in parallel with the axis, forming a bundle of parallel laser beams, that is, a pseudo-single beam.

Figure 1B:
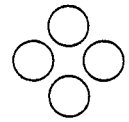
FIG. 1B is a schematic sectional view of the bundle of beams produced by the apparatus of FIG. 1A.
Figure 2A:
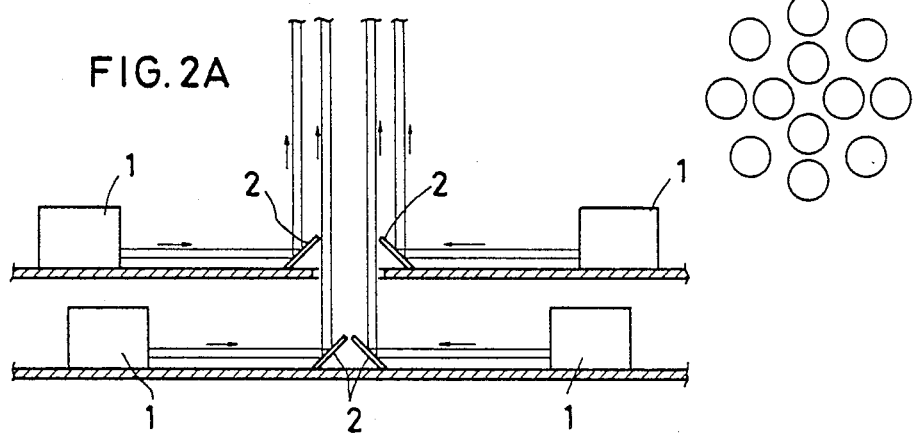
FIG. 2A is a schematic sectional view of another example of the apparatus according to the first embodiment.
Figure 2B:
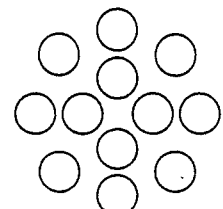
FIG. 2B is a schematic sectional view of the bundle of beams produced by the apparatus of FIG. 2A.

In FIG. 1, four beams are emitted from four lasers 1, respectively, and are reflected by the respective directing mirrors 2 to form a densely packed bundle of four parallel beams. FIG. 1B shows a sectional view of the bundle. If it is desired to increase the number of parallel beams, e.g. eight lasers and eight directing mirrors are arranged on a second plane over and parallel to the plane used in FIG. 1, as shown in FIG. 2A, so that an additional eight beams will be added to the outside of the four-beam bundle to form a pseudo-single laser beam consisting of twelve beams. FIG. 2B shows a sectional view of the 12-beam bundle. If it is necessary to form a bundle consisting of a greater number of beams, the number of planes may be increased in which directing mirrors and lasers are similarly arranged.

Figure 3:
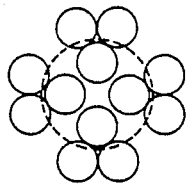
FIG. 3 is a schematic sectional view of the bundle of beams produced by the method of the first embodiment in which each beam is a bundle of three beams.
Figure 4:
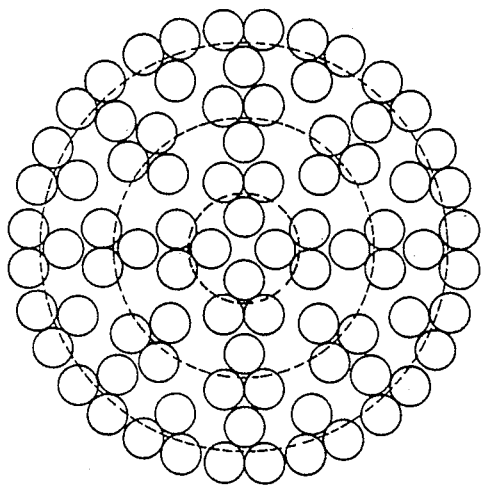
FIG. 4 is a schematic sectional view of another example of the bundle of beams produced by the method of the first embodiment by use of the apparatus of FIG. 1A but having a three-plane construction, each beam being a bundle of three beams.

It is also possible to collect a plurality of bundles of beams formed by use of the apparatus as shown in FIG. 1 or 2 into one thick pseudo-single beam consisting of a great number of beams. For example, by combining four bundles each consisting of three beams, a 12-beam bundle can be formed by use of the apparatus of FIG. 1, as shown in FIG. 3. If the apparatus is of a two-plane construction as shown in FIG. 2A, twelve 3-beam bundles can be combined into up to a 36-beam bundle. If it is of a three-plane construction, it is possible to combine 28 three-beam bundles into an 84-beam bundle, the sectional view of which is shown in FIG. 4. Similarly, it will not be so difficult to further add horizontal planes and place more lasers and directing mirrors to generate a bundle composed of a greater number of beams. It will be also possible to arrange lasers and directing mirrors spirally around the reference line instead of putting them in the same plane. It is to be understood that such an arrangement falls within the scope of the present invention.

[Second Embodiment]

Figure 1C:
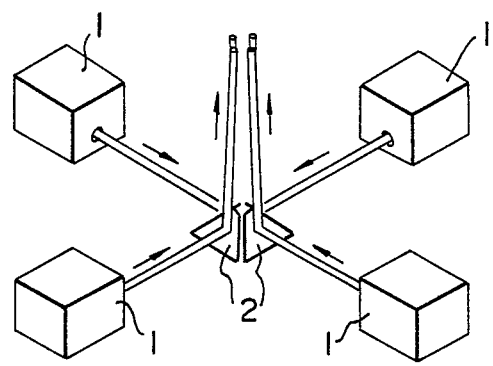
FIG. 1C is a schematic perspective view of he apparatus according to the second embodiment.
Figure 2C:
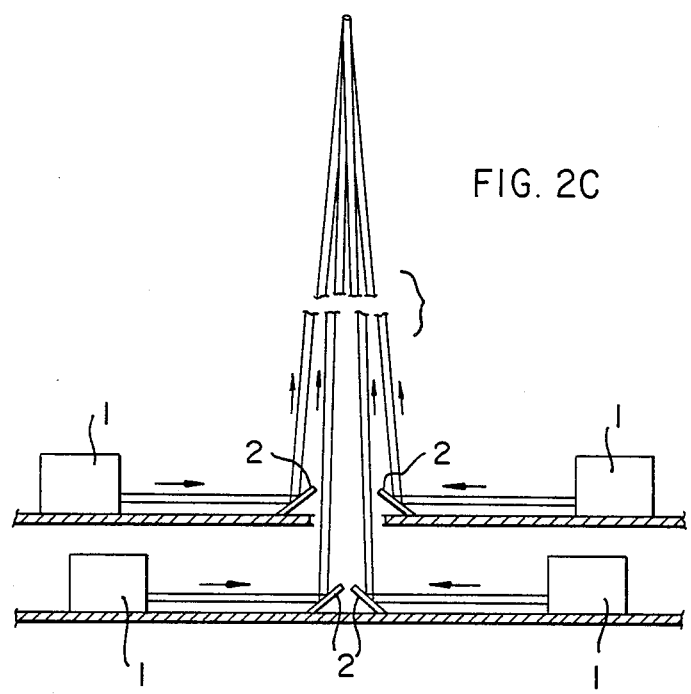
FIG. 2C is a schematic sectional view of another example of the apparatus according to the second embodiment.

Next, the second embodiment will be described in which an ultra-high power, ultra-high density pseudo-single laser beam is formed by being the apparatus in the first embodiment. In this embodiment, the directing mirrors form such an angle with respect to the reference line that the beams reflected by the mirrors will not be parallel to each other but converge on a limited space apart from the mirrors by a desired distance (FIG. 1C). In other words, by determining the angle of the mirrors so that the centers of the reflected beams (if each of the beams is a bundle of beams, the centers of such bundles)

will be focused on the reference line at a single point spaced apart from the mirrors by a desired distance, all the beams can be collected in a predetermined limited space. By setting the angle of the mirrors as described above, four 3-beam bundles can be converged in a limited space as shown in FIG. 5A instead of merely collecting them into a bundle of parallel beams as shown in FIG. 3. FIG. 5B shows how the twelve 3-beam bundles generated by the two-plane apparatus as shown in FIG. 2C which is similar in arrangement to FIG. 2A are converged in a small, circular space.

[Third Embodiment]

FIGS. 6 and 7 illustrate a method and an apparatus of converging a plurality of laser beams on a focal point to generate an ultra-high power, ultra-high density laser beam at the focal point The method of focusing one laser beam on a single point by means of a concave focusing mirror is known as the "Arata Laser Focus System" which is shown in FIG. 6. Arata is the name of one of the present inventors. In this method, it is necessary to set the angle $\theta$ between the beam directed at the focusing mirror and the beam reflected by the mirror within a certain range of angle, practically 2 to 6 degrees.

Now, referring to FIG. 7, a laser beam generator for carrying out the method of the third embodiment comprises a central focusing mirror 4, a plurality of reflecting mirrors 3 and the same number of directing mirrors 2. Each of the two groups of mirrors is arranged around the optical axis of the central focusing mirror 4, that is, the axis of the device, at equal angular intervals.

In FIG. 7, five beams emitted by lasers (not shown) are reflected by their respective directing mirrors 2 and then by the respective reflecting mirrors 3 to be directed at the central focusing mirror 4, which focuses the beams on to a common focal point on the axis, keeping the angle between the incoming beams and the reflected beams within the above said critical range.

As shown in FIG. 8, as many focusing mirrors 4 as the reflecting mirrors 3 may be provided around the reference axis in a circle so that each beam reflected by a respective reflecting mirror 3 will be further reflected by each focusing mirror 4 so as to be converged on a common focal point on the reference axis.

[Fourth Embodiment]

The bundles of parallel beams formed in the first embodiment may be used as beams in the third embodiment. By so doing, a plurality of bundles of parallel beams are converged on a common focal point by means of the apparatus in the third embodiment to generate an ultra-high power, ultra-high density laser beam

What is claimed is:

1. The apparatus for generating an ultra-high power, ultra-high density pseudo-single laser beam, comprising:

a plurality of lasers arranged in a plane radially around a reference axis, each generating a laser beam toward the reference axis; and a plurality of directing mirrors arranged, in the same plane as said plurality of lasers, at such an angle with respect to said lasers as to converge reflected beams of said laser beams into a limited narrow space.

2. The apparatus as claimed in claim 1, wherein each of said laser beams is a bundle of a plurality of laser beams.

3. The apparatus as claimed in claim 1, wherein said lasers and said directing mirrors are provided on the same one plane.

4. The apparatus as claimed in claim 1, further comprising at least one further plurality of lasers and plurality of directing mirrors arranged in another plane parallel to said plane.

* * * * *